(12) United States Patent
Saito et al.

(10) Patent No.: US 7,374,418 B2
(45) Date of Patent: May 20, 2008

(54) FLUID COOLED SPRING BIASED VALVE NOZZLE

(75) Inventors: Toshio Saito, Tokyo (JP); Mei Mori, Tokyo (JP)

(73) Assignee: FISA Corporation, Tokyo (JP)

( * ) Notice: Subject to any disclaimer, the term of this patent is extended or adjusted under 35 U.S.C. 154(b) by 248 days.

(21) Appl. No.: 11/251,848

(22) Filed: Oct. 18, 2005

(65) Prior Publication Data

US 2006/0127521 A1 Jun. 15, 2006

(30) Foreign Application Priority Data

Dec. 15, 2004 (JP) .......................... P2004-362107

(51) Int. Cl.
*B29C 45/23* (2006.01)
(52) U.S. Cl. ...................... 425/549; 425/564
(58) Field of Classification Search ................ 425/547, 425/548, 549, 562, 563, 564, 565, 566
See application file for complete search history.

(56) References Cited

U.S. PATENT DOCUMENTS

| | | | |
|---|---|---|---|
| 3,231,938 A | | 2/1966 | Seymour |
| 3,797,984 A | * | 3/1974 | Yago et al. ............... 425/543 |
| 4,010,903 A | | 3/1977 | Sakuri et al. |
| 5,513,976 A | * | 5/1996 | McGrevy ................. 425/549 |

FOREIGN PATENT DOCUMENTS

| | | |
|---|---|---|
| DE | 1 802 369 | 10/1969 |
| EP | 0 818 295 | 1/1998 |
| FR | 2 273 646 | 1/1976 |
| WO | WO 95/02494 | 1/1995 |

* cited by examiner

*Primary Examiner*—Tim Heitbrink
(74) *Attorney, Agent, or Firm*—Roylance, Abrams, Berdo & Goodman, L.L.P.

(57) ABSTRACT

The present invention provides a valve nozzle that can restrain property changes of an injecting melted resin by more strictly controlling the temperature of the injecting melted resin, wherein in the internal space or the rear space of a valve nozzle main body, a gate opening and closing mechanism is disposed which includes a torpedo provided with a coolant channel, a piston including a head portion, a shaft portion that is continued from the head portion and disposed in the internal space of the torpedo by being provided with a gap to serve as a resin flow channel on its outer circumferential surface, a tapered surface that is connected to the rear end of the shaft portion and serves as a surface for receiving the pressure of a resin in the resin flow channel, and a coil spring that presses the rear end part of the piston toward a gate, and when the pressure of the melted resin is at a predetermined value or less, the piston is pressed by the coil spring toward the gate to close the resin flow channel, and when the pressure of the resin reaches a predetermined value or more, it overcomes the pressing force of the coil spring and the head portion of the piston withdraws from the gate of the nozzle head to release the gate.

6 Claims, 3 Drawing Sheets

FLUID COOLED SPRING BIASED VALVE NOZZLE

BACKGROUND OF THE INVENTION

1. Field of the Invention

The present invention relates to a valve nozzle used for a synthetic resin molding machine, more specifically, a valve nozzle and a shut-off nozzle used for runner-less molding.

2. Description of the Prior Arts

To obtain moldings with stable quality by a resin molding machine, temperature management control is an essential matter during melting of a raw material resin, injecting of the melting resin into a mold and solidifying inside the mold, and removal from the mold after solidifying.

To control the temperature of the resin injected into the mold, there is known a technique of controlling the temperature of the cavity by supplying a coolant into the mold, proposed in Patent Documents of Document 1 (Japanese Patent No. 3345196), Document 2 (Japanese Examined Patent Publication No. H07-59375), Document 3 (Japanese Unexamined Patent Publication No. H04-65214), Document 4 (Japanese Unexamined Utility Model Publication No. H04-11614), and so on.

According to the inventors' research, with the techniques shown in the above Documents 1 through 4, satisfactory temperature control is possible during injection molding by using a general resin, and moldings with stable quality are obtained, however, in the case of injection molding of silicone rubber or urethane rubber, etc., that requires more strict temperature control, in particular, foaming injection molding, it was found that properties changed when injecting.

SUMMARY OF THE INVENTION

Therefore, an object of the present invention is to provide a valve nozzle that can prevent changes in properties of an injecting melted resin by strictly controlling the temperature of the injected resin.

The invention that achieves this object has the following construction.

1. A valve nozzle, wherein in an internal space or a rear space of a valve nozzle main body including a nozzle holder and a nozzle head attached to the front end of the nozzle holder, a gate opening and closing mechanism is disposed which includes:

a torpedo that is disposed in the internal space of the valve nozzle main body and provided with a coolant channel, a piston including a head portion disposed inside a gate of the nozzle head, a shaft portion that is formed to continue from the head portion, disposed in the internal space of the torpedo and provided with a gap on the outer circumferential surface to serve as a resin channel, and a rear end part that is connected to the rear end of the shaft portion and has a tapered surface to serve as a surface for receiving a pressure of the resin in the resin flow channel, and a coil spring that is disposed in deferent position from outside the resin flow channel on the rear side of the torpedo and presses the rear end part of the piston toward the gate, and when the pressure of the resin is at a predetermined value or less, the piston is pressed toward the gate by the coil spring and the entire circumference of a circular sectional portion at the head part of the piston comes into contact with the gate inner wall of the nozzle head to close the resin flow channel, and when the pressure of the resin reaches a predetermined value or more, it overcomes the pressing force of the coil spring and the head part of the piston withdraws from the gate of the nozzle head and releases the gate.

2. The valve nozzle according to the above 1, wherein a resin that has been guided to the inside of the gate opening and closing mechanism through the resin flow channel is filled to the gate by passing through the resin flow channel as a gap between the inner circumferential surface of the torpedo and the shaft portion outer circumferential surface of the piston and passing between the gate inner wall of the nozzle head and the head portion of the piston, and when the gate is closed, the resin is not injected but stays at this position, and after the gate is opened, the resin is injected into the cavity of a mold, and when the nozzle is closed, the outer circumference of the circular sectional portion near the front end of the head portion is in contact with the inner wall of a circular hole of the gate and the resin flow channel is closed, however, when the pressure of the resin received by the tapered surface as the pressure receiving surface of the piston reaches a predetermined value or more, the pressure overcomes the pressing force of the coil spring and the head part of the piston withdraws from the gate of the nozzle head and releases the gate to open the resin flow channel.

3. The valve nozzle according to the above 1 or 2, wherein the coolant channel is formed so that a forward channel continued to a coolant inlet formed on one end side of the torpedo is twisted with respect to the axial direction of the torpedo and spirally turned toward the other end side of the torpedo, and the forward channel is reversed via a coolant flow reversing part formed into a concave portion at the other end side of the torpedo to become a return channel, and the return channel is twisted and spirally turned toward one end side in parallel to the forward channel, whereby forming a duplex spiral form continued to a coolant outlet formed on one end side of the torpedo.

4. The valve nozzle according to the above 1 or 2, wherein the coolant channel is formed to connect a coolant inlet formed on one end side of the torpedo and a coolant outlet formed on the other end side.

5. The valve nozzle according to any of the above 1 through 4, wherein the coolant channel is formed with concave grooves on the outer circumferential surface of the torpedo.

6. The valve nozzle according to any of the above 1 through 4, wherein the coolant channel is formed with through holes in the torpedo.

7. The valve nozzle according to the above 1 or 2, wherein the coolant channel is a gap formed between the outer circumferential surface of the torpedo and the inner circumferential surface of the valve nozzle main body.

DETAILED DESCRIPTION OF PREFERRED EMBODIMENTS

Next, the invention is described in more detail with reference to the accompanying drawings.

Figure 1:
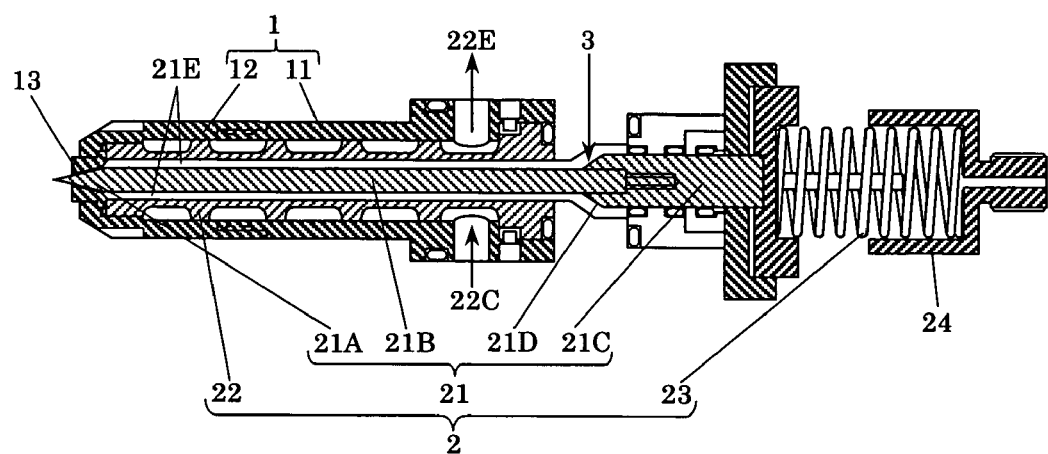
FIG. 1 is a sectional view showing an embodiment of a valve nozzle according to the present invention.

In FIG. 1, the valve nozzle according to the present invention mainly includes a valve nozzle main body 1 and a gate opening and closing mechanism 2 disposed in the internal space or rear space of the valve nozzle main body 1.

The valve nozzle main body 1 includes a nozzle holder 11 and a nozzle head 12 screwed to the nozzle holder 11, and a gate 13 is formed at the front end of the nozzle head.

In the gate opening and closing mechanism 2, a torpedo 22 that is disposed in the internal space of the valve nozzle main body 1 and provided with coolant channels 22A and 22B, a piston 21 including a head portion 21A disposed inside the gate 13 of the nozzle head 12, a shaft portion 21B that is formed so as to continue from the head portion 21A and disposed in the internal space of the torpedo 22 and provided with a gap 21E to serve as a resin flow channel 3 on its outer circumferential surface, and a rear end part 21C having a tapered surface 21D that is connected to the rear end of the shaft portion 21B and serves as a resin pressure receiving surface inside the resin flow channel 3, and a coil spring 23 that is disposed outside the resin flow channel in the rear space of the torpedo 22 and presses the rear end part 21C of the piston 21 toward the gate 13, are installed, and the gate opening and closing mechanism 2 is disposed in the internal space or rear space of the valve nozzle main body 1.

Figure 2:
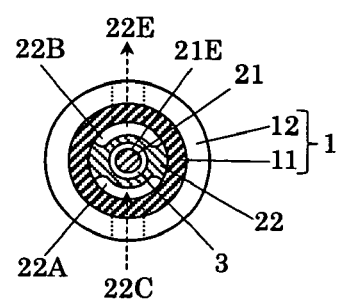
FIG. 2 is a main part sectional view of a resin flow channel and a coolant channel.

The gate opening and closing mechanism 2 is disposed in the internal space of the valve nozzle main body 1 so that spaces are left between the outer circumferential surface of the torpedo 22 and the inner circumferential surface of the valve nozzle main body 1. Namely, as shown in FIG. 2, concave grooves to serve as coolant channels 22A and 22B formed on the outer circumferential surface of the torpedo 22 become the spaces between said outer circumference and the inner circumferential surface of the valve nozzle main body 1, and these spaces become coolant channels 22A and 22B. The outer circumferential surface that has no concave grooves to serve as the coolant channels 22A and 22B of the torpedo 22 comes into contact with the inner circumferential surface of the valve nozzle main body 1, and supports the gate opening and closing mechanism 2 including the torpedo 22 into the internal space of the valve nozzle main body 1.

The concave grooves to become the coolant channels 22A and 22B may be formed as concave grooves on the outer circumferential surface of the torpedo 22, or may be relatively formed into concave grooves by forming the outer circumferential surface of the torpedo 22 to be convex except for the portions to become the concave grooves as coolant channels 22A and 22B, or these methods may be combined and used.

Figure 3:
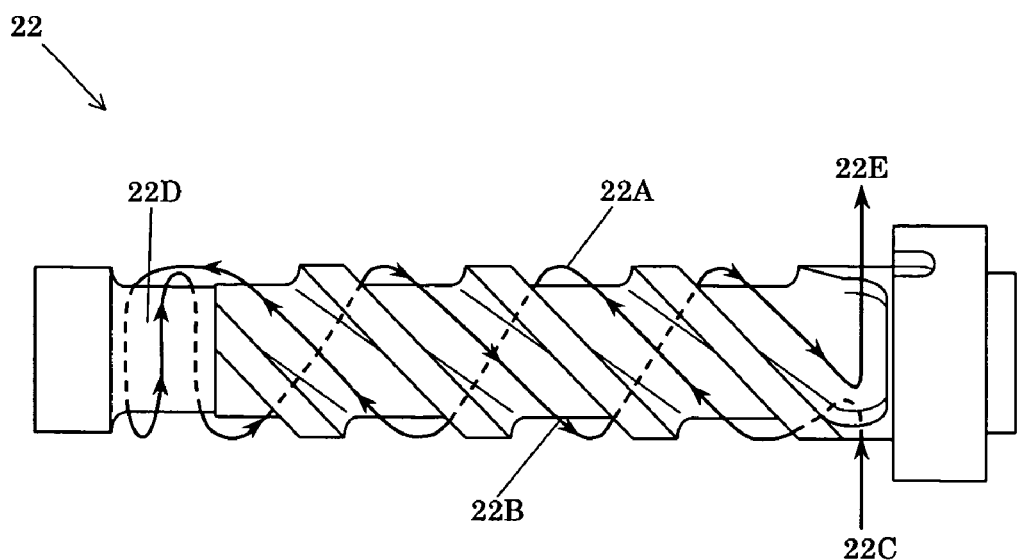
FIG. 3 is a front view of a torpedo.

The coolant channels 22A and 22B, as shown in FIG. 3 are formed into a duplex spiral form in that a forward channel 22A continued to a coolant inlet 22C formed on one end side (right side in the drawing) of the torpedo 22 is twisted with respect to the axial direction of the torpedo 22 and spirally turned toward the other end side (left side in the drawing), and it is reversed via a coolant flow reversing part 22D as a concave portion formed on the other end side of the torpedo 22 to become a return channel 22B, and the return channel 22B is twisted and spirally turned toward one end side in parallel to the forward channel 22A and continued to a coolant outlet 22E formed on one end side of the torpedo 22.

The coolant channels 22A and 22B of this embodiment are concave grooves formed on the outer circumferential surface of the torpedo 22, however, the invention is not limited thereto, and the coolant channels may be through holes formed in the torpedo 22, that is, through holes formed inside so as not to be exposed to the outer circumferential surface of the torpedo 22. In this case, the inner circumferential surface of the valve nozzle main body 1 and the outer circumferential surface of the torpedo 22 are in contact with each other without spaces.

Furthermore, the coolant inlet 22C and the coolant outlet 22E of this embodiment are formed on one end side of the torpedo 22, however, these may be formed on the other end side, or may be formed at the center or halfway.

Furthermore, it is also possible that a one-way coolant channel is formed without forming the coolant flow reversing part 22D, and the coolant inlet 22C is formed on either one end side or the other end side and the coolant outlet 22E is formed on the opposite side, and these are connected by the coolant channel.

Furthermore, it is also possible that, in place of the spirally turned coolant channels 22A and 22B, the coolant channels are formed to reciprocate roughly straightly, zig-zag, or meandering between one end and the other end of the torpedo 22.

It is also possible that the coolant inlet 22C and/or the coolant outlet 22E are provided with two or more of each, or only either one is a plurality in place of providing these one each.

Furthermore, the coolant channels may be formed into a gap formed between the outer circumferential surface of the torpedo 22 and the inner circumferential surface of the valve nozzle main body 1 in place of concave grooves. Namely, almost the whole outer circumferential surface of the torpedo serves as a coolant channel.

In the present invention, as a coolant to flow in the coolant channels 22A and 22B, a known general coolant for temperature control used for a mold for molding such a kind of resin can be used without special limitation, which includes not only liquids such as water but also gases. The "coolant" means being colder than a high-temperature melting resin, and even hot water at 40 through 100° C. is also included in the coolant as long as it controls the temperature of the valve nozzle.

Next, the flow of the melted resin and opening and closing of the gate 13 are described.

Figure 4:
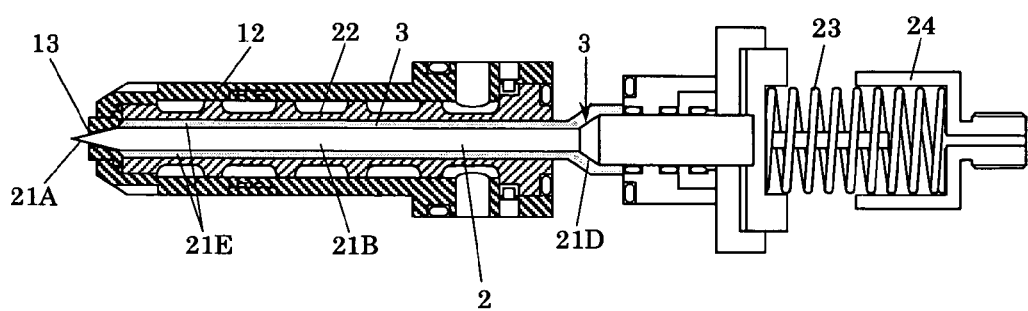
FIG. 4 is an explanatory sectional view of a gate closing state.

The resin that has been guided to the inside of the gate opening and closing mechanism 2 through the resin flow channel 3 is filled to the gate 13 by passing through the resin flow channel 3 as a gap 21E between the inner circumferential surface of the torpedo 22 and the outer circumferential surface of the shaft portion 21B of the piston 21 and passing between the inner wall of the gate 13 of the nozzle head 12 and the head portion 21A of the piston 21. When the gate 13 is closed (shown in FIG. 4), the melted resin is not injected but stays at this position, and after the gate 13 is opened (shown in FIG. 5), the melted resin is injected to the inside of the cavity of the mold.

Namely, the outer circumference of a circular sectional portion of the piston 21 near the front end of the head portion 21A is in contact with the inner wall of a circular hole of the gate 13 when the nozzle is closed (shown in FIG. 4), and the resin flow channel is closed.

Figure 5:
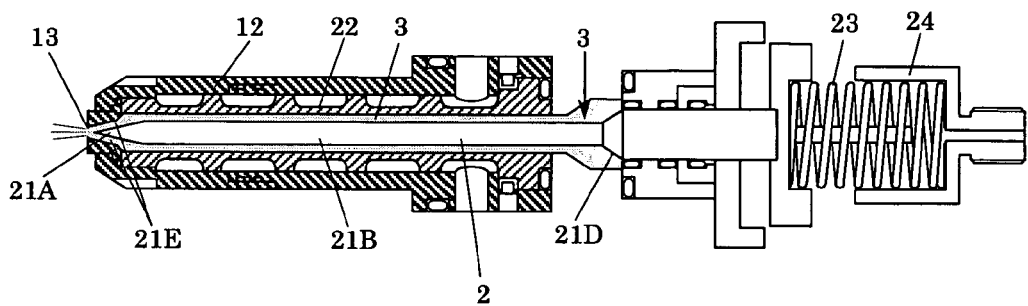
FIG. 5 is an explanatory sectional view of a gate opening state.

Then, when the pressure of the melted resin received by the tapered surface 21D as a pressure receiving surface of the piston 21 reaches a predetermined value or more, it overcomes the pressing force of the coil spring 23 and the head portion 21A of the piston 21 withdraws from the gate 13 and releases the gate 13 to open the resin flow channel 3 (shown in FIG. 5). It is preferable that the withdrawing amount of the piston 21 is properly set based on the pressing force of the coil spring 23 and positional adjustments of a spring bearing 24, and other components, etc. When the pressure of the melted resin becomes the predetermined value or less, the piston 21 returns to the state shown in FIG. 4 and the resin flow channel 3 is closed.

According to the embodiment of the invention constructed as described above, since the torpedo 22 provided with coolant channels 22A and 22B is disposed in the internal space of the valve nozzle main body 1, the temperature of the injecting melting resin passing through the inside of the torpedo 22 can be more strictly controlled. Therefore, even if a delicate resin such as liquid silicone rubber that changes its properties in response to a slight temperature change is used, the changes in properties of the injecting resin can be restrained and stable moldings can be obtained.

Particularly, by forming the coolant channels 22A and 22B into reciprocating channels having a duplex spiral form in that the channels are reversed from one end side to the other end side of the torpedo 22 and spirally turned around the axis, the torpedo 22 can be entirely controlled in temperature, so that the temperature of the injecting melting resin passing through the inside of the torpedo 22 can be more strictly controlled. Therefore, property changes of the injecting resin can be significantly restrained.

In addition, since the coil spring 23 is disposed in deferent position from the resin flow channel 3, the resin does not pass through the inside of the coil spring 23 that is a component of the gate opening and closing mechanism 2. Therefore, in comparison with a valve nozzle in which a resin passes through the inside space of the coil spring 23, the resin flow is very smooth and troubles due to resin clogging or resin solidification rarely occur, and maintenance is easy.

According to the present invention, the following effects are expected.

According to the present invention described in claims 1 and 2, a torpedo with coolant channels is disposed in the internal space of a valve nozzle that includes a nozzle holder and a nozzle head attached to the front end of the nozzle holder, so that the temperature of an injecting melted resin passing through the inside of the torpedo can be more strictly controlled. Therefore, property changes of the injecting resin can be restrained. Particularly, not only can the temperature balance be easily made well by a coolant upon setting the mold temperature to be high, but also disassembly and maintenance are easy and maintenance performance is high.

According to the present invention described in claim 3, the coolant channels are formed into a duplex spiral form in that the channels are reciprocating channels reversed from one end to the other end of the torpedo and spirally turned around the axis, whereby the torpedo can be entirely controlled in temperature. Therefore, the temperature of the injecting melting resin passing through the inside of the torpedo can be more strictly controlled. Accordingly, property changes of the injecting resin can be restrained.

According to the present invention described in claim 4, a coolant channel is formed to connect a coolant inlet formed on one end side of the torpedo and a coolant outlet formed on the other end side, whereby the resin that has entered from the inlet smoothly passes through the outlet, whereby the temperature control efficiency is improved.

According to the present invention described in claim 5, coolant channels are formed into concave grooves formed on the outer circumferential surface of the torpedo, whereby not only are the coolant channels easily formed but also high maintenance performance is obtained.

According to the present invention described in claim 6, coolant channels are through holes formed in the torpedo, whereby the temperature can be controlled from the inside of the torpedo, so that high control efficiency is obtained.

According to the present invention described in claim 7, a coolant channel is formed into a gap between the outer circumferential surface of the torpedo and the inner circumferential surface of the valve nozzle main body, whereby the torpedo outer circumferential surface can be entirely evenly adjusted in temperature.

What is claimed is:

1. A valve nozzle, comprising:
   a main body having an internal space, a rear space, a nozzle holder, and a nozzle head attached on a front end of said nozzle holder and having a gate with an inner wall defining a circular hole; and
   a gate opening and closing mechanism including
      a torpedo in said internal space,
      a piston having a head portion inside said gate of said nozzle head in a closed position and retracted from said gate in an opened position, a shaft portion extending from said head portion and a rear end part connected to a rear end of said shaft portion, said head portion and said shaft portion being in said torpedo, and having a circumferential gap on an outer circumferential surface thereof providing a resin flow channel between and about said outer circumferential surface of said shaft portion and an inner circumferential surface of said torpedo, said rear end part having a tapered surface for receiving a pressure of resin in said resin flow channel, said head portion having a circular sectional portion adjacent a front end thereof in contact with said inner wall of said gate in said closed position;
      a coil spring disposed outside said resin flow channel on a rear side of said torpedo and pressing said rear end part toward said gate, and
      a coolant channel on said torpedo having a forward channel and a return channel, said forward channel extending from a coolant inlet formed on one end of said torpedo and twisting and spiraling relative to an axial direction of said torpedo toward an opposite end of said torpedo to end in a concave portion at said opposite end, said return channel extending from said concave portion and twisting and spiraling toward said one end parallel to said forward channel to end at a coolant outlet, said forward and return channels forming a duplex spiral between said coolant inlet and said coolant outlet;
   whereby, resin conveyed inside of said gate opening and closing mechanism fills said resin flow channel to pass between said inner wall of said gate and said head portion of said piston for injection into a mold cavity when in said open position; whereby said resin remains in said resin flow channel in said closed position; and whereby said resin in said resin flow channel applies pressure to said tapered surface until such pressure reaches or exceeds a predetermined value and overcomes a pressing force of said coil spring to remove said head portion of said piston from said gate to open said resin flow channel.

2. A valve nozzle according to claim 1 wherein said coolant channel is connected to said coolant inlet on one side of said torpedo and to said coolant outlet on another side of said torpedo.

3. A valve nozzle according to claim 1 wherein said coolant channel comprises concave grooves on an outer circumferential surface of said torpedo.

4. A valve nozzle according to claim 1 wherein said coolant channel comprises through holes in said torpedo.

5. A valve nozzle according to claim 1 wherein said coolant channel comprises a gap between an outer circumferential surface of said torpedo and an inner circumferential surface of said main body.

6. A valve nozzle according to claim 1 wherein said circumferential gap is provided on opposite longitudinal sides of said head portion and said shaft portion.

* * * * *